United States Patent
Baum

(10) Patent No.: US 11,572,954 B2
(45) Date of Patent: Feb. 7, 2023

(54) SHUT-OFF VALVE, COKING DRUM AND METHOD

(71) Applicant: Z & J Technologies GmbH, Düren (DE)

(72) Inventor: Elke Baum, Eschweiler (DE)

(73) Assignee: Z & J Technologies GmbH, Düren (DE)

( * ) Notice: Subject to any disclaimer, the term of this patent is extended or adjusted under 35 U.S.C. 154(b) by 0 days.

(21) Appl. No.: 17/400,854

(22) Filed: Aug. 12, 2021

(65) Prior Publication Data

US 2022/0049774 A1    Feb. 17, 2022

(30) Foreign Application Priority Data

Aug. 13, 2020 (DE) .................... 102020121349.2

(51) Int. Cl.
*F16K 3/14* (2006.01)
*C10B 25/10* (2006.01)
(Continued)

(52) U.S. Cl.
CPC ............ *F16K 3/14* (2013.01); *C10B 25/10* (2013.01); *C10B 33/12* (2013.01); *F16K 3/029* (2013.01);
(Continued)

(58) Field of Classification Search
CPC ........ F16K 3/14; F16K 3/0209; F16K 3/0281; F16K 3/029; F16K 3/18; F16K 3/316;
(Continued)

(56) References Cited

U.S. PATENT DOCUMENTS

| 992,027 A | 5/1911 | Morlock |
| 1,788,763 A | 1/1931 | Gant et al. |

(Continued)

FOREIGN PATENT DOCUMENTS

| DE | 1087419 A | 8/1960 |
| GB | 1204069 | 9/1970 |
| WO | WO-2003104353 A1 | 12/2003 |

OTHER PUBLICATIONS

European Search Report, Application No. EP 21189350, dated Jan. 13, 2022, 12 pages.

(Continued)

*Primary Examiner* — John Bastianelli
(74) *Attorney, Agent, or Firm* — Cesari and McKennna, LLP

(57) ABSTRACT

This disclosure relates to a shut-off valve, in particular a pipe-bridge slide valve, for a coking drum for the production of coke, having at least one pipe socket which has a first end for connection to the coking drum and a second end on which a slider is arranged for opening and closing the coking drum, wherein the pipe socket has a supply connection for filling the coking drum with a medium and a diaphragm which is arranged between the supply connection and the first end of the pipe socket and can be moved into a filling position and into an emptying position, wherein, in the filling position, a diaphragm opening is arranged in the region of the central longitudinal axis of the pipe socket for introducing the medium centrally into the coking drum, and, in the emptying position, the diaphragm opening has a larger passage area than in the filling position.

20 Claims, 3 Drawing Sheets

(51) Int. Cl.
*C10B 33/12* (2006.01)
*F16K 3/02* (2006.01)
*F16K 3/18* (2006.01)
*F16K 3/316* (2006.01)
*F16K 27/04* (2006.01)
*F16K 11/22* (2006.01)
*F16K 11/20* (2006.01)

(52) U.S. Cl.
CPC .......... *F16K 3/0209* (2013.01); *F16K 3/0281* (2013.01); *F16K 3/18* (2013.01); *F16K 3/316* (2013.01); *F16K 11/207* (2013.01); *F16K 11/22* (2013.01); *F16K 27/044* (2013.01)

(58) Field of Classification Search
CPC ...... F16K 11/207; F16K 11/22; F16K 27/044; C10B 25/10; C10B 33/12
USPC ........................................................ 251/331
See application file for complete search history.

(56) References Cited

U.S. PATENT DOCUMENTS

| | | | |
|---|---|---|---|
| 2,871,170 A | | 1/1959 | Bewvley et al. |
| 4,295,773 A | | 10/1981 | Dhondt |
| 5,148,829 A | | 9/1992 | Deville |
| 5,947,674 A | * | 9/1999 | Malsbury ................ C10B 33/00 202/241 |
| 7,914,668 B2 | | 3/2011 | Siskin et al. |
| 2003/0127314 A1 | | 7/2003 | Bell et al. |
| 2007/0108036 A1 | | 5/2007 | Siskin et al. |
| 2013/0032465 A1 | * | 2/2013 | Lah ........................ C10B 25/10 202/241 |

OTHER PUBLICATIONS

Examination Report for German Patent Application No. 10 2020 121 349.2, dated Jun. 9, 2021, 12 pages.

* cited by examiner

SHUT-OFF VALVE, COKING DRUM AND METHOD

CROSS REFERENCE TO RELATED APPLICATIONS

The present application is a National Stage application which claims priority to German Patent Application No. 102020121349.2, filed Aug. 13, 2020, which application is incorporated herein by reference in its entirety.

TECHNICAL FIELD

The invention relates to a shut-off valve having the features of the preamble of claim 1, a coking drum comprising such a shut-off valve, and a method for producing coke in a coking drum connected to such a shut-off valve. Such a shut-off valve is known, for example, from DE 10 2012 101 015 A1.

BACKGROUND

Coke is mainly produced by a process known as delayed coking. In this process, a feedstock, for example crude oil or residues from vacuum distillation, is heated to about 500° C. in an oven at pressures of about 30 bar and is then introduced at high speed into a coking chamber or coking drum fluidically connected to the oven. There, the feedstock cokes at about 4 bar. For optimal filling of the coking drum, it is desirable that the feedstock is introduced centrally, i.e. approximately in the middle based on the diameter of the coking drum. For emptying the coking drum, however, this region must be kept free so that the coke can be removed from the coking drum and a cutting tool can be introduced if necessary.

DE 10 2012 101 015 A1, which originates from the applicant, solves this problem in that the slider valve, which closes the coking drum at the bottom, is equipped with a pipeline through which the feedstock can be introduced centrally into the coking drum. When the coking drum is emptied, the slider valve is moved to the open position together with the pipeline so that the coke can be removed without any problems. This technology works excellently, but requires a certain design effort and corresponding costs in the production of the slider.

SUMMARY

The object of the invention is to improve the above-mentioned shut-off valve in such a way that the central filling of the coking drum with a medium is possible with the simplest possible construction of the fitting. A further object of the invention is to provide a coking drum comprising such a shut-off valve, and also a method in which the coking drum is connected to such a shut-off valve.

According to the invention, this object is achieved with regard to the shut-off valve by the subject matter of claim 1, with regard to the coking drum by the subject matter of claim 14, and with regard to the method by the subject matter of claim 15.

Specifically, the object is achieved by a shut-off valve, in particular a pipe-bridge slide valve, for a coking drum for the production of coke, having at least one pipe socket. The pipe socket has a first end for connection to the coking drum and a second end, on which a slider is arranged for opening and closing the coking drum. The pipe socket has a supply connection for filling the coking drum with a medium and a diaphragm. The diaphragm is arranged between the supply connection and the first end of the pipe socket and can be moved into a filling position and into an emptying position. In the filling position, a diaphragm opening is arranged in the region of the central longitudinal axis of the pipe socket for introducing the medium centrally into the coking drum. In the emptying position, the diaphragm opening has a larger passage area than in the filling position.

The invention has the advantage that the diaphragm allows central filling of the coking drum without obstructing the emptying process. For this purpose, the pipe socket has a diaphragm with a diaphragm opening, the size of which can be changed. Specifically, the diaphragm can be moved into a filling position and into an emptying position. In the filling position, the diaphragm opening is arranged in the region of the central longitudinal axis of the pipe socket. This ensures that the medium that passes through the diaphragm during filling is fed centrally to the coking drum. The aligned arrangement between the pipe socket and the coking drum results from the fact that the coking drum is attached to, in particular flange-mounted on, the first end of the pipe socket. At the same time, the diaphragm allows easy emptying in the coking drum because the diaphragm can be moved from the filling position to an emptying position. Since the passage area of the diaphragm opening is larger in the emptying position than in the filling position, access to the coking drum is cleared by the shut-off valve. For this purpose, the slider of the shut-off valve can be moved to the open position in a manner known per se, thus releasing the pipe socket. The coke can be removed from the coking drum. It is also possible that a cutting tool is introduced into the coking drum through the shut-off valve and the diaphragm arranged in the emptying position.

It is understood that the diaphragm is designed in such a way that it covers the cross-sectional area of the pipe socket except for the diaphragm opening. In other words, the diaphragm closes off the pipe socket and leaves the cross-sectional area of the pipe socket free only in the region of the diaphragm opening. The shape of the diaphragm can be adapted to the cross-sectional area of the pipe socket. For example, if the pipe socket is round, the diaphragm also has a round circumference. However, this is not absolutely necessary as long as the diaphragm is large enough to cover the cross-sectional area of the pipe socket.

In an embodiment described in more detail below, when the diaphragm is fully closed, it covers the entire cross-sectional area of the pipe socket.

Preferred embodiments of the invention are described in the dependent claims.

For example, the supply connection can be arranged in a wall of the pipe socket and can open out into a space of the pipe socket between the slider and the diaphragm. This has the advantage that the feed of the medium via the pipe socket into the coking drum is simple from a constructional viewpoint. The piping of the slider for opening and closing the coking drum is not required.

In a particularly preferred embodiment, the diaphragm comprises a slide valve with a split slide plate. The partial plates of the split slide plate can be moved in opposite directions. In the filling position, the partial plates form the diaphragm opening in the region of the central longitudinal axis for introducing the medium centrally into the coking drum. The design of the diaphragm as a slide valve with a split slide plate is simple and robust. The split plates, which can be moved in opposite directions, allow the diaphragm to be easily moved into the filling position and into the emptying position. Here, the path of travel of the partial plates is adjusted in such a way that in the filling position they form the diaphragm opening in the region of the central longitudinal axis, so that the medium can be introduced centrally into the coking drum.

It is not excluded—this applies generally to the invention—that the diaphragm is completely closed, for example to build up pressure when filling with the medium. In this case, in addition to the filling position and the emptying position, the diaphragm can be moved into a further position, namely into a closed position.

It is favourable that each partial plate is connected to a slide rod in order to move the partial plates in opposite directions. The slide rod can be driven in various ways, for example electrically, hydraulically, mechanically or pneumatically. It is possible to use the same type of drive as for the slider. However, this is not absolutely necessary.

The partial plates can have inner edges which, in the filling position, form the diaphragm opening. The inner edges delimit the particular partial plate on the one hand and the diaphragm opening in the filling position on the other. The partial plates are arranged opposite each other.

The inner edges can be protected against wear. However, this is not absolutely necessary.

In one embodiment, the inner edges are straight and form a slit-like diaphragm opening in the filling position. This embodiment is easy to realise.

In a further embodiment, at least one of the inner edges, in particular both inner edges, are profiled and form an at least partially curved diaphragm opening in the filling position. This embodiment has the advantage that the diaphragm opening is limited to a comparatively small local region of the cross-sectional area of the pipe socket, so that the central supply of the medium is concentrated to a region around the central longitudinal axis of the pipe socket. With this embodiment, the advantage that the medium is introduced centrally into the coking drum can be achieved particularly well. It is not absolutely necessary here that the diaphragm opening is completely curved. For example, one inner edge can be straight and the other inner edge curved. It is also possible for both inner edges to be curved, resulting in a diaphragm opening with a completely curved circumference, for example an oval or circular diaphragm opening.

In another preferred embodiment, the diaphragm opening forms a closed circumference in the filling position. The diaphragm opening is thus completely surrounded and limited by the inner edges or the profiled regions of the (curvature) in the edges. This has the advantage that the medium is completely concentrated to the region around the central longitudinal axis. In the case of the split slide plate, this means that the partial plates are moved towards each other or positioned in the filling position in such a way that they form a completely closed diaphragm opening.

Preferably, at least one, in particular both inner edges form a concave recess. The two concave recesses together delimit the diaphragm opening in the filling position.

Preferably, the partial plates are movable over each other in the region of the inner edges. This embodiment has the advantage, especially with the profiled inner edges, that the cross-sectional area of the diaphragm opening can be changed so that the volume flow of the medium can be regulated when filling the coking drum.

In general, the volume flow of the medium can be controlled when filling the coking drum by changing the diaphragm. Further possibilities for this, other than changing the cross-sectional area by moving the inner edges over each other as described above, are also conceivable.

In a further preferred embodiment, the passage area of the diaphragm opening corresponds substantially to the entire passage area of the pipe socket when the coking drum is emptied. This has the advantage that practically the entire passage area of the pipe socket can be used for coke removal.

A particularly simple and at the same time robust embodiment is achieved when the diaphragm forms a plate having at least one first and second diaphragm opening and which is movable into the filling position and into the emptying position. In the filling position, the first diaphragm opening is arranged in the region of the central longitudinal axis of the pipe socket for introducing the medium centrally into the coking drum. In the emptying position, the second diaphragm opening is arranged in the region of the central longitudinal axis of the pipe socket for emptying the coking drum. The second diaphragm opening has a larger passage area than the first diaphragm opening.

Accordingly, the change of the passage area of the diaphragm can be achieved not only by changing the diameter of the diaphragm, but also by at least 2 diaphragm openings, which are formed in a plate or in a frame, for example. The diaphragm opening in question is activated by moving the plate or the frame in the pipe socket. For this purpose, the centre of the particular diaphragm opening is moved into the region of the central longitudinal axis or approximately onto the central longitudinal axis. To fill the coking drum, the smaller of the two diaphragm openings is moved into the region of the central longitudinal axis. To empty the coking drum, the larger of the two diaphragm openings is moved into the region of the central longitudinal axis.

In the context of the invention, the shut-off valve is claimed on its own, i.e. without the coking drum. In addition, the shut-off valve is also disclosed and claimed in conjunction with the coking drum, as indicated in the coordinated claim 14.

In the method for producing coke in a coking drum, the drum is connected to the shut-off valve according to the invention. In the method, to fill the coking drum with a medium, the diaphragm is moved to the filling position. The medium is fed into the pipe socket through the supply connection. Through the diaphragm, the medium is fed from there into the coking drum, more specifically centrally in relation to the coking drum.

Preferably, during the method the flow rate of the medium into the coking drum is changed by the diaphragm. To empty the coking drum, the diaphragm is moved to the emptying position.

The invention is explained in more detail below by means of exemplary embodiments with reference to the accompanying schematic drawings.

DESCRIPTION

Figure 1:
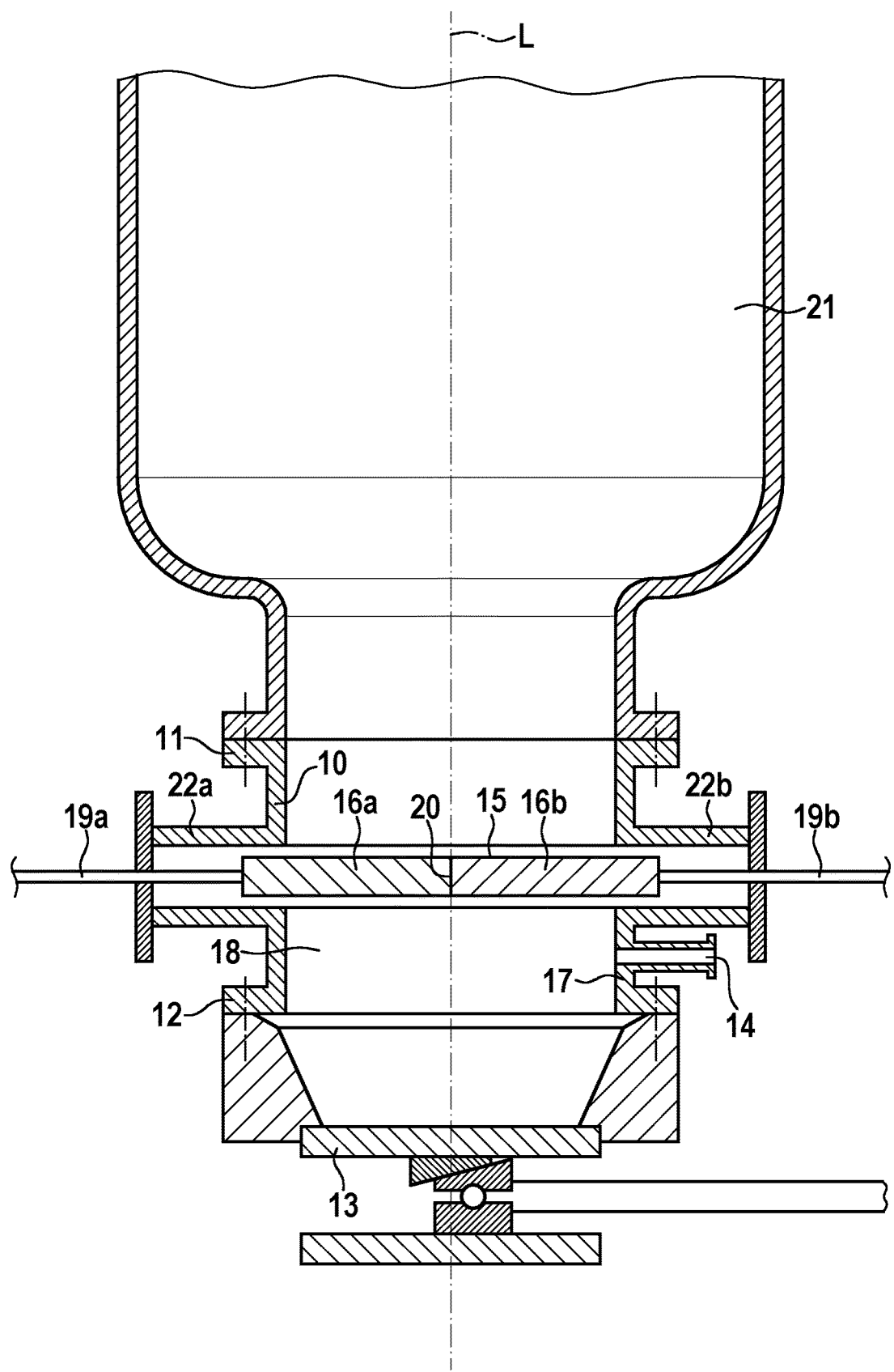
FIG. 1 shows a sectional view of a shut-off valve according to an exemplary embodiment according to the invention, which is connected to a coking drum.

The shut-off valve shown in FIG. 1 is connected to a coking drum 21 or coking chamber. The shut-off valve is disclosed and claimed both by itself, i.e. without coking drum 21, and in the installed state with coking drum 21. As shown in FIG. 1, the outlet opening of the coking drum 21 is connected, in particular screwed, to a first end of the pipe socket 10 of the shut-off valve. The second end 12 of the pipe socket 10 is connected to a slider 13, which is provided for opening and closing the coking drum 21. The further pipe socket usually provided on the other side of the slider 13 is not shown.

As shown in FIG. 1, in the installed state the first end 11 of the pipe socket 10 is arranged at the top and the second end 12 at the bottom in the vertical direction.

The pipe socket 10 is cylindrical. Other cross-sectional shapes are possible.

The coking drum and the shut-off valve are aligned in a direction along the central longitudinal axis L, which runs longitudinally in the middle or centrally through the coking drum 21 and the pipe socket 10.

The shut-off valve according to FIG. 1 is designed as a pipe-bridge slide valve. The slider 13 of the shut-off valve is designed as a double-plate slider. Such double-plate sliders are known. Other sliders, for example single-plate sliders, can also be used. The slider 13 closes the coking drum in the operating state. The slider 13 can also be referred to as the main slider or shut-off slider.

The pipe socket 10 has a supply connection 14, which is connected to the wall 17 of the pipe socket. The supply connection 14 can, for example, be designed as a nozzle to which a pipe is connected. The supply connection 14 serves to introduce the medium intended for filling the coking drum into the pipe socket 10. Possible media are, for example, crude oil or residues from vacuum distillation.

A diaphragm 15 is arranged between the supply connection 14 and the first, upper end 11 of the pipe socket 10. The diaphragm 15 covers the entire cross-sectional area of the pipe socket 10.

The diaphragm 15 can be moved into a filling position and into an emptying position. FIG. 1 additionally shows a third position, in which the diaphragm 15 is completely closed (closed position). In the filling position, the diaphragm is partially open, more specifically to such an extent that a diaphragm opening results in the region of the central longitudinal axis L of the pipe socket 10. The diaphragm opening is large enough to allow the medium introduced through the supply connection 14 to flow into the coking drum 21. Specifically, the medium flows into a space 18 of the pipe socket 10 formed between the slider 13 and the diaphragm 15 in the pipe socket 10. The supply connection 14 opens out into this space 18.

The diaphragm opening is positioned in the region of the central longitudinal axis L of the coking drum or the pipe socket 10. Here, the diaphragm opening can be arranged symmetrically to the central longitudinal axis L so that it passes through the centre of the diaphragm opening. Deviations from this position are acceptable as long as the central supply of the medium into the coking drum 21 is enabled.

To empty the coking drum 21, the diaphragm 15 is fully opened. The passage area of the diaphragm is therefore larger in the emptying position than the passage area of the diaphragm in the filling position. In the emptying position, the pipe socket 10 is released, in particular completely released, to such an extent that the coke located in the coking drum 21 can be removed. For this purpose, it may be necessary to insert a cutting tool into the outlet opening of the coking drum, which is easily possible when the diaphragm 15 is fully open.

As shown in FIG. 1 to 4, the diaphragm 15 is designed as a slider valve with a split slide plate 16. The slide plate 16 is composed of at least two partial plates 16a, 16b, which can be moved in opposite directions. As shown in FIG. 1, the partial plates 16a, 16b are moved radially outwards in relation to the central longitudinal axis L to open the diaphragm 15 and radially inwards to close the diaphragm 15. For the filling process, the partial plates 16a, 16b are not completely closed as shown in FIG. 1, but are partially closed so that the diaphragm opening is formed between the partial plates 16a, 16b.

The partial plates 16a, 16b can be moved in such a way that, in the filling position, they form the diaphragm opening in the region of the central longitudinal axis L, so that the medium can be introduced centrally through the diaphragm 15 into the coking drum 21.

Figure 3:
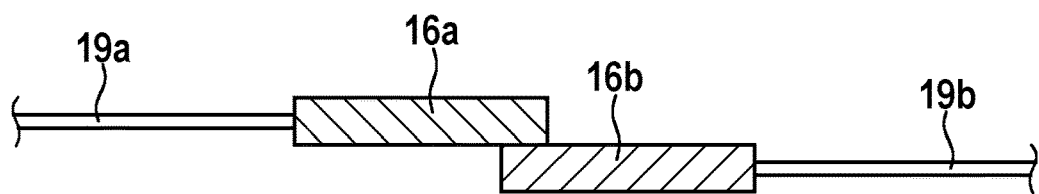
FIG. 3 shows a sectional view of a diaphragm with partial panels arranged one above the other.
Figure 4:
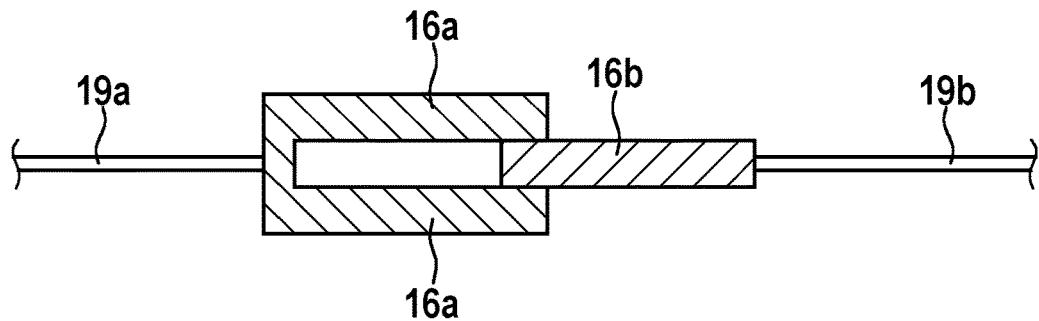
FIG. 4 shows a sectional view of a diaphragm with fork-shaped partial plates.

As can be clearly seen in FIGS. 1, 3 and 4, each partial plate 16a, 16b is connected to its own slide rod 19a, 19b so as to be able to move the partial plates 16a, 16b in opposite directions towards or away from each other. The partial plates 16a, 16b are guided or arranged in housing extensions 22a, 22b, which are radially arranged on the pipe socket 10. The first housing attachment 22a receives the first partial plate 16a (left partial plate in FIG. 1) and the second housing attachment 22b receives the second partial plate 16b (right partial plate in FIG. 1).

The two partial plates 16a, 16b each form inner edges 20. The inner edges 20 delimit the partial plates 16a, 16b on the one hand and the diaphragm on the other hand when the partial plates 16a, 16b are partially open.

There are various possibilities for the design of the inner plates 16a, 16b.

The inner edges 16a, 16b can be straight (not shown in FIG. 1). If the diameter is circular, the partial plates 16a, 16b form semi-circles. The inner edges 16a, 16b run through the centre of the circular split slide plate 16 as shown in FIG. 1. In the closed position shown in FIG. 1, the inner edges 20 are butted against each other. If the inner edges are slightly moved apart in the filling position, they form a slot-like or slit-like diaphragm opening, the width of which is such that a sufficiently large volume flow of the medium for filling the coking drum 21 can pass through the diaphragm 15. The slit-like diaphragm opening is positioned so that the central longitudinal axis L passes through it. During filling, the medium flows through the slit-like diaphragm opening into the coking drum 21.

Figure 2:
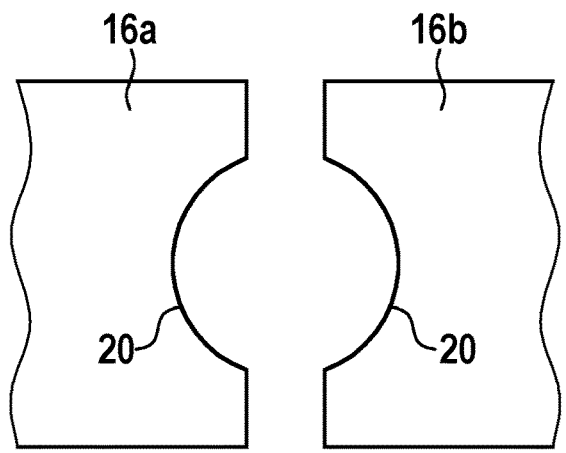
FIG. 2 shows a plan view of a diaphragm with profiled partial plates.

In the variant according to FIG. 2, the inner edges 20 are profiled. It is also possible that one inner edge is straight and the other inner edge is profiled. In the filling position, the inner edges 20 form a diaphragm opening that is curved at least in some sections. For this purpose, the two inner edges 20 have concave recesses that are arranged symmetrically and together form the diaphragm opening.

FIG. 2 shows an intermediate position, in which the partial plates 16a, 16b are moved from the filling position into the emptying position, i.e. away from each other. In the filling position, the two partial plates 16a, 16b are arranged so close to each other that the diaphragm opening is formed by the two recesses.

This can be done by arranging the two partial plates 16a, 16b in different planes and thus moving them over each other, as shown in FIG. 3. As a result, the partial plates 16a, 16b partially overlap, at least at the edges, so that the diaphragm opening is formed by the two recesses or the profiled inner edges 20. The diaphragm opening is therefore completely closed on the circumference so that the medium is concentrated to the region around the central longitudinal axis L.

The diaphragm opening is oval in the exemplary embodiment according to FIG. 2. Other contours, for example circular diaphragm openings, are possible. The possibility of moving the two partial plates 16a, 16b one above the other and relative to each other has the further advantage that the size of the diaphragm opening can be varied. This allows the volume flow through the diaphragm into the coking drum to be controlled.

Alternatively to the arrangement of the two partial plates 16a, 16b as shown in FIG. 3, it is also possible to form one of the two partial plates 16a, 16b in a fork-shaped design, as shown in FIG. 4. The cross-sectionally fork-shaped design of the two partial plates 16a, 16b creates a gap between the partial plates 16a, 16b, into which gap the other partial plate 16a, 16b can enter in order to achieve the overlapping of the partial plates 16a, 16b and thus the delimitation and modification of the diaphragm.

To empty the coking drum 21, the partial plates 16a, 16b are moved apart completely radially outwards, so that the entire cross-sectional area of the pipe socket is exposed.

Figure 5:
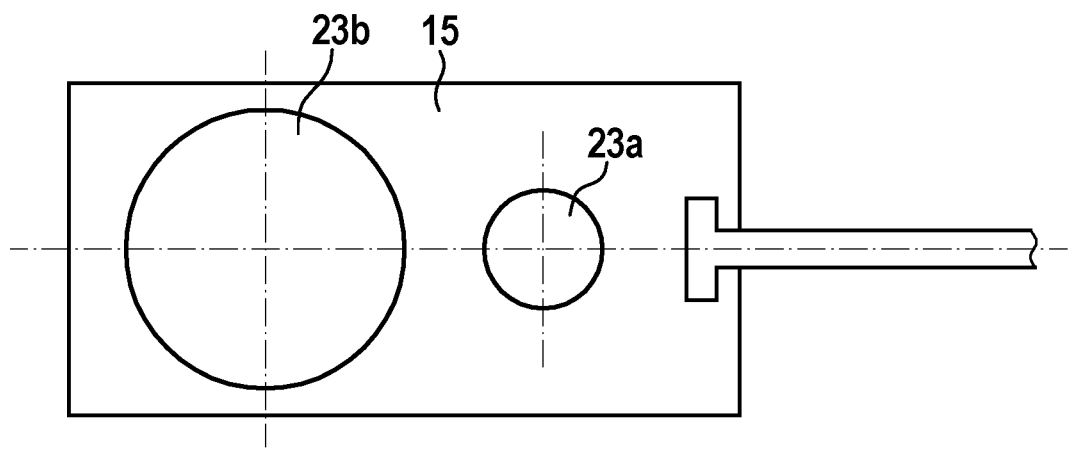
FIG. 5 shows a plan view of a diaphragm with a continuous plate and 2 diaphragm openings.

Another variant of the diaphragm for the shut-off valve is shown in FIG. 5. In contrast to the previous exemplary embodiments, the diaphragm 15 is designed as a continuous, i.e. not split, plate. The change in diaphragm opening is made possible by the plate having two diaphragm openings, a first diaphragm opening 23a and a second diaphragm opening 23b. The two diaphragm openings 23a, 23b are arranged one behind the other in the direction of movement of the plate. This ensures that either the first or the second diaphragm 23a, 23b can be moved into the pipe socket, more specifically in such a way that the centre of the particular diaphragm 23a, 23b approximately coincides with the central longitudinal axis L of the pipe socket 10. The diaphragm openings 23a, 23b are thus arranged coaxially with the pipe socket 10 in the respective position. The smaller diaphragm opening 23a is used for central filling of the coking drum 21. The larger diaphragm opening 23b is used for emptying the coking drum. This provides a very simple way to achieve filling of the coking drum through the centre of the pipe socket on the one hand, whilst not interfering with emptying of the coking drum through the diaphragm on the other hand, since the diaphragm opening with the larger diameter is used for emptying.

10 pipe sockets
11 first end
12 second end
13 slider
14 supply connection
15 diaphragm
16a first partial plate
16b second partial plate
17 wall
18 pipe socket space
19a first slide rod
19b second slide rod
20 inner edges
21 coking drum
22a first housing attachment
22b second housing attachment
23a first diaphragm opening
23b second diaphragm opening

The invention claimed is:

1. A shut-off valve of a coking drum comprising:
a pipe socket having a first end for connection to the coking drum and a second end on which a slider is configured and arranged for opening and closing the coking drum;
a supply connection included in the pipe socket for filling the coking drum with a medium; and
a diaphragm included in the pipe socket configured and arranged between the supply connection and the first end of the pipe socket, wherein the diaphragm is movable into a filling position and into an emptying position,
wherein, in the filling position, a diaphragm opening is arranged in a region of a central longitudinal axis of the pipe socket for introducing the medium centrally into the coking drum, and
wherein, in the emptying position, the diaphragm opening has a larger passage area than in the filling position.

2. The shut-off valve of claim 1, wherein the supply connection is arranged in a wall of the pipe socket and opens into a space of the pipe socket between the slider and the diaphragm.

3. The shut-off valve of claim 1, wherein the diaphragm further comprises a slide valve with a split slide plate, wherein partial plates of the split slide plate are movable in opposite directions and in the filling position to form the diaphragm opening in the region of the central longitudinal axis for introducing the medium centrally into the coking drum.

4. The shut-off valve of claim 3, wherein each partial plate is connected to a slide rod to move the partial plates in opposite directions.

5. The shut-off valve of claim 3, wherein the partial plates have inner edges, which form the diaphragm opening in the filling position.

6. The shut-off valve of claim 5, wherein the inner edges are straight and form a gap-like diaphragm opening in the filling position.

7. The shut-off valve of claim 5, wherein at least one of the inner edges is profiled and, in the filling position, form the diaphragm opening which is curved at least in some sections.

8. The shut-off valve of claim 7, wherein the diaphragm opening forms a closed circumference in the filling position.

9. The shut-off of claim 7, wherein at least one of the inner edges forms a concave recess.

10. The shut-off valve of claim 7, wherein the partial plates are movable over each other in a region of the inner edges.

11. The shut-off valve of claim 1, wherein the diaphragm forms a plate with at least one of first or second diaphragm openings, wherein the plate is movable into the filling position and into the emptying position,
wherein, in the filling position, the first diaphragm opening is configured and arranged in the region of the central longitudinal axis of the pipe socket for introducing the medium centrally into the coking drum and,
wherein in the emptying position, the second diaphragm opening is arranged in the region of the central longitudinal axis of the pipe socket for emptying the coking drum and has a larger passage area than the first diaphragm opening.

12. A shut-off valve of a coking drum comprising:
a pipe socket having a first end for connection to the coking drum and a second end on which a slider is configured and arranged for opening and closing the coking drum;
a supply connection included in the pipe socket for filling the coking drum with a medium; and
a diaphragm included in the pipe socket configured and arranged between the supply connection and the first end of the pipe socket, wherein the diaphragm is movable into a filling position and into an emptying position,
wherein, in the filling position, a diaphragm opening is arranged in a region of a central longitudinal axis of the pipe socket for introducing the medium centrally into the coking drum,
wherein, in the emptying position, the diaphragm opening has a larger passage area than in the filling position, and
wherein a volume flow of the medium when filling the coking drum is controllable by changing the diaphragm opening.

13. The shut-off valve of claim 12, wherein the passage area of the diaphragm opening when emptying the coking drum corresponds substantially to a passage area of the pipe socket.

14. The shut-off valve of claim 12, wherein the supply connection is arranged in a wall of the pipe socket and opens into a space of the pipe socket between the slider and the diaphragm.

15. The shut-off valve of claim 12, wherein the diaphragm further comprises a slide valve with a split slide plate, wherein partial plates of the split slide plate are movable in opposite directions and in the filling position form the diaphragm opening in the region of the central longitudinal axis for introducing the medium centrally into the coking drum.

16. The shut-off valve of claim 15, wherein each partial plate is connected to a slide rod to move the partial plates in opposite directions.

17. The shut-off valve of claim 15, wherein the partial plates have inner edges, which form the diaphragm opening in the filling position.

18. A method for producing coke in a coking drum connected to a shut-off valve, the method comprising:
providing a pipe socket having a first end for connection to the coking drum and a second end on which a slider is configured and arranged for opening and closing the coking drum;
providing a supply connection included in the pipe socket for filling the coking drum with a medium;
providing a diaphragm included in the pipe socket configured and arranged between the supply connection and the first end of the pipe socket, wherein the diaphragm is movable into a filling position and into an emptying position,
wherein, in the filling position, a diaphragm opening is arranged in a region of a central longitudinal axis of the pipe socket for introducing the medium centrally into the coking drum;
wherein, in the emptying position, the diaphragm opening has a larger passage area than in the filling position;
filing the coking drum with the medium; and
moving the diaphragm into the filling position, wherein the medium is fed though the supply connection into the pipe socket and through the diaphragm into the coking drum centrally with respect to the coking drum.

19. The method of claim 18, wherein a volume flow of the medium into the coking drum is changed by the diaphragm.

20. The method of claim 18, wherein the diaphragm is moved into the emptying position for emptying the coking drum.

* * * * *